United States Patent
Gauba et al.

(10) Patent No.: US 9,609,529 B1
(45) Date of Patent: Mar. 28, 2017

(54) OPTIMIZING COVERAGE BY CUSTOMIZING SIGNAL PATTERNS

(71) Applicant: Sprint Communications Company L.P., Overland Park, KS (US)

(72) Inventors: Maneesh Gauba, Overland Park, KS (US); Stephen R. Bales, Lee's Summit, MO (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 3 days.

(21) Appl. No.: 14/449,679

(22) Filed: Aug. 1, 2014

(51) Int. Cl.
*H04W 24/02* (2009.01)
*H04W 52/24* (2009.01)
*H04W 72/04* (2009.01)

(52) U.S. Cl.
CPC ......... *H04W 24/02* (2013.01); *H04W 52/243* (2013.01); *H04W 72/0446* (2013.01)

(58) Field of Classification Search
CPC ..... H04W 16/24; H04W 16/28; H04W 16/00; H04W 24/00; H04W 72/04
USPC ............................. 455/452.1, 522, 63.1, 63.2
See application file for complete search history.

(56) References Cited

U.S. PATENT DOCUMENTS

| | | | |
|---|---|---|---|
| 2002/0090979 A1* | 7/2002 | Sydor ........................... 455/562 |
| 2005/0073980 A1* | 4/2005 | Thomson ..................... 370/338 |
| 2005/0075142 A1* | 4/2005 | Hoffmann ............ H04B 7/0608 | 455/562.1 |
| 2009/0016545 A1* | 1/2009 | Stelliga ........................ 381/94.3 |
| 2011/0065448 A1* | 3/2011 | Song ..................... H04B 7/0632 | 455/452.2 |
| 2011/0124343 A1* | 5/2011 | Hong ............................ 455/446 |
| 2012/0252467 A1* | 10/2012 | Chen ..................... H04W 16/18 | 455/446 |
| 2012/0290720 A1* | 11/2012 | Stamoulis ..................... 709/224 |
| 2013/0040676 A1* | 2/2013 | Kang .................... H04B 7/0495 | 455/509 |
| 2013/0072247 A1* | 3/2013 | Park ..................... H04B 7/0408 | 455/513 |
| 2013/0095846 A1* | 4/2013 | Brisebois ................... 455/456.1 |
| 2014/0038631 A1* | 2/2014 | Kruglick ........... H04W 72/0426 | 455/452.2 |
| 2014/0198766 A1* | 7/2014 | Siomina .............. H04W 72/082 | 370/330 |

* cited by examiner

*Primary Examiner* — Kashif Siddiqui
*Assistant Examiner* — Ather Mohiuddin (57) ABSTRACT

Systems, methods, and computer-readable media for optimizing coverage for a cell site are provided. Cell sites are typically configured with antennas that emit a standard petal lobe pattern for a sector. The needs of the sector are not taken into account since a standard pattern is emitted for all antennas. The antennas may be adjusted at times to increase signal strength to particular regions but the pattern then returns to the standard petal pattern. Customized patterns may be created in order to optimize coverage for a sector. Sector needs may be taken into consideration such as object interference, geographical information, population data, and the like, in order to crate the customized pattern for a sector. The antenna may then emit the customized pattern for a predetermined length of time as a static pattern for that cell site.

18 Claims, 6 Drawing Sheets

OPTIMIZING COVERAGE BY CUSTOMIZING SIGNAL PATTERNS

BRIEF SUMMARY

A high-level overview of various aspects of the invention is provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, optimizing coverage by customizing signal patterns. A standard signal pattern utilized for telecommunications networks is a standard petal lobe pattern. Cell sites are typically equipped with a tower (including various elements) configured to emit a standard signal pattern (i.e., the standard petal lobe pattern) without consideration to specific needs of a sector. Thus, many sectors are associated with cell towers that emit signal patterns that do not suit the needs of the sector to optimize coverage. By creating customized signal patterns based on sector needs, coverage may be optimized for the sector.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention may be embodied as, among other things, a method, a system, or a set of instructions embodied on one or more computer-readable media. As mentioned, embodiments of the present invention are directed toward optimizing coverage by customizing signal patterns. Signal patterns may be customized for a sector based on sector needs, as indicated by one or more characteristics of the sector. The characteristics may include population data, the shape of the coverage area, object interference data of the coverage area, demographic data, geographic data, and the like. The custom signal pattern may be selected from a plurality of signal patterns available to a coverage area. By creating customized signal patterns based on sector needs, coverage may be optimized for the sector.

Accordingly, in one aspect, the present invention is directed to one or more computer-readable storage media having computer-executable instructions embodied thereon that, when executed, perform a method of optimizing coverage. The method includes receiving data regarding one or more characteristics of a coverage area; based on the one or more characteristics, identifying a predetermined signal pattern for the coverage area; and adjusting a power of one or more power amplifiers to create the predetermined signal pattern to be emitted for a predetermined period of time.

In another aspect, embodiments of the present invention are directed to a method for optimizing coverage by adjusting signal patterns in a wireless communications network. The method includes receiving data regarding one or more characteristics of a coverage area; identifying one or more signal patterns available to a radio tower serving the coverage area; based on the one or more characteristics, identifying a predetermined signal pattern of the one or more signal patterns available to the coverage area; and adjusting a power of one or more power amplifiers to create the predetermined signal pattern to be emitted for a predetermined period of time.

In yet another aspect, the present invention is directed to one or more computer-readable storage media having computer-executable instructions embodied thereon that, when executed, perform a method of optimizing coverage. The method includes a receiving data regarding at least object interference data; based on the object interference data, identifying a predetermined signal pattern that differs from a standard petal lobe pattern for the coverage area; and creating the predetermined signal pattern by setting a power of one or more power amplifiers to correspond with the predetermined signal pattern such that the predetermined signal pattern is emitted as a static pattern for a predetermined period of time.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
4G Fourth Generation Mobile Telecommunications
BF Beam Forming
CD-ROM Compact Disk Read Only Memory
CDMA Code Division Multiple Access
GPRS General Packet Radio Service
GSM Global System for Mobile communications: originally from Groupe Spécial Mobile
DVD Digital Versatile Discs
EEPROM Electrically Erasable Programmable Read Only Memory
eNodeB Evolved Node B
LTE Long Term Evolution PA Power Amplifier
PC Personal Computer
PDA Personal Digital Assistant
RAM Random Access Memory
ROM Read Only Memory
TDMA Time Division Multiple Access
UE User Equipment
UMTS Universal Mobile Telecommunications System
VOIP Voice Over Internet Protocol
VoLTE Voice Over LTE
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
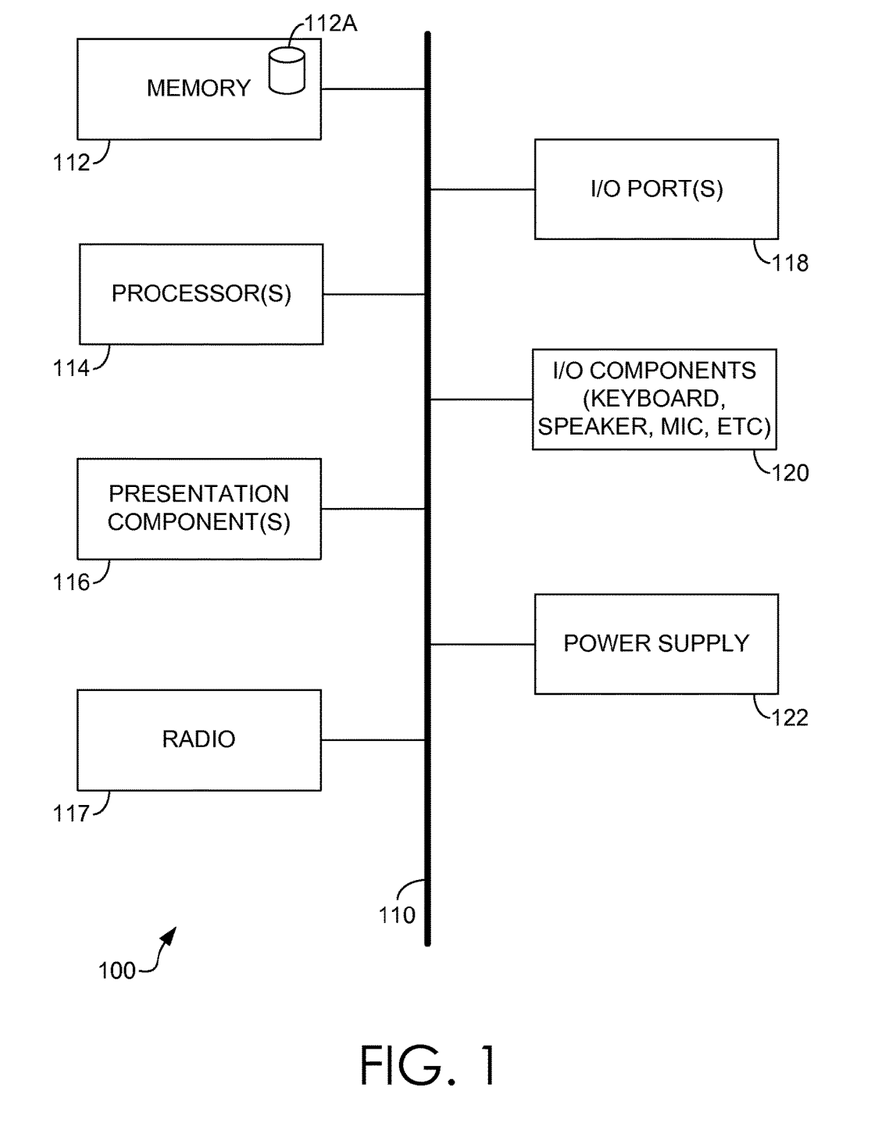
FIG. 1 depicts an exemplary computing device, according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

Figure 2:
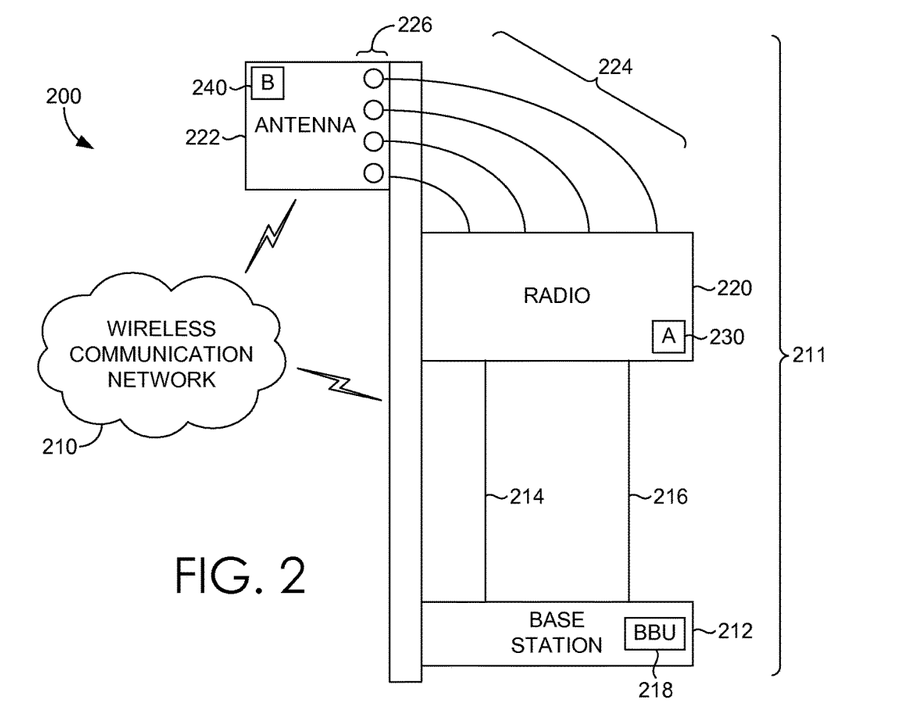
FIG. 2 depicts a wireless communication network in communication with an exemplary radio tower, according to an embodiment of the present invention.

Turning now to FIG. 2, a wireless communication system 200 in accordance with one embodiment of the present invention is illustrated, which includes a wireless communication network 210 and a radio tower 211. The radio tower 211 may be a tall structure designed to support an antenna (s), e.g., antenna 222, for telecommunications and/or broadcasting. The radio tower 211 is not intended herein to be limited to any shape and/or structure. For example, the radio tower 211 may be a building or pole on which a transmitting antenna is installed. In other embodiments, a mobile radio tower may be employed.

As illustrated in FIG. 2, the radio tower 211 includes or is associated with a base station 212, a radio 220, and an antenna 222. In embodiments, the base station 212 is a wireless communications station that is installed at a fixed location, such as near the base of the radio tower 211. In other embodiments, base station 212 is a mobile base station. The base station 212 may be an eNode B in an LTE telecommunications network and is used to communicate as part of the wireless communications network 210. For example, the base station 212 can facilitate wireless communication between a communications device and a network(s). A communications device includes a device that uses a wireless communications network. A communications device may take on a variety of forms, such as a personal computer (PC), a laptop computer, a tablet, a mobile phone, a personal digital assistant (PDA), a server, or any other device that is capable of communicating with other devices using a wireless telecommunications network. In one embodiment, a communications device is the communications device described in relation to FIG. 1 herein. Such a network might be a single network or multiple networks, as well as being a network of networks. A network(s) might comprise, for example, a cable network, an Intranet, the Internet, a wireless network (e.g., a wireless telecommunications network), or a combination thereof or portions thereof.

The base station 212 may include at least one baseband unit (BBU) 218. In general, the BBU 218 may be responsible for, among other things, digital baseband signal processing. For instance, CDMA/EVDO and LTE Internet protocol (IP) packets are received from a wireless communications network and are digitally combined by the BBU 218. The blended digital baseband signal is then transmitted to a radio 220. Digital baseband signals received from the radio 220 are demodulated by the BBU 218 and the resulting IP packets are then transmitted by the BBU 218 to the core network.

The radio 220 may include at least one transceiver configured to receive and transmit signals or data. For example, the radio 220 may transmit and receive wireless RF signals. The radio 220 converts the blended digital signal received from the BBU 218 into an analog RF output via a digital-to-analog (AD) converter. The analog signal is then amplified by an amplifier in the radio 220 and sent out for transmission to a communications device via the antenna port 226 of the antenna 222. The RF signals received from the communications device via the antenna ports 226 are amplified by the radio 220 and converted to digital baseband signals for transmission to the BBU 218.

The radio tower 211 of FIG. 2 can include a radio 220 that is positioned remote from the base station 212. The base station 212 can be connected to the radio 220 via one or more data transmission paths 214 and 216, such as one or more fiber optic cables. In alternative embodiments not depicted in FIG. 2, the radio 220 is integrated within the base station 212.

The radio 220 generally communicates with the antenna 222. In this regard, the radio 220 is used to transmit signals or data to the antenna 222 and receive signals or data from the antenna 222. Communications between the radio 220 and the antenna 222 can occur using any number of physical paths, e.g., physical paths 224. A physical path 224, as used herein, refers to a path used for transmitting signals or data. As such, a physical path 224 may be referred to as a radio frequency (RF) path, a coaxial cable path, cable path, or the like.

The antenna 222 is used for telecommunications. Generally, an antenna is an electrical device that converts electric power into radio waves and converts radio waves into electric power. The antenna 222 is typically positioned at or near the top of the radio tower 211. Such an installation location, however, is not intended to limit the scope of embodiments of the present invention.

The antenna 222 of FIG. 2 may be configured to support multiple-input-multiple-output (MIMO) and beam forming transmission modes. In embodiments, the radio tower 211 may rely on a MIMO transmission mode when a communications device is located near the radio tower, and may rely on a beam forming transmission mode when the communications device is located on the periphery of a coverage area.

A power amplifier (PA) element 230 including one or more power amplifiers may be located within the radio 220 or the antenna 222 may be equipped with a radio/PA combined element 240. Power amplifiers are used generally to adjust a power of a signal. Traditionally, a four-port antenna (similar to antenna 222 illustrated in FIG. 2) includes four ports that are each associated with a PA and, in turn, the four-port antenna would be able to emit four signals. In the present invention, the antenna 222 is capable of dividing the signal into many more signals (more than four) on the scale of hundreds of signals. This would be possible by including a plurality of power amplifiers within either the antenna 222 or the radio 220 to form hundreds of arrays, each being capable of providing a different power to form a customized signal pattern.

Given the plurality of arrays possible in the present invention, the antenna 222 may emit a plurality of patterns. Typically, the radio tower 211 may product a standard, preconfigured pattern that is not based on sector needs but, rather, based on a standard pattern associated with the radio tower 211. This standard pattern is typically a standard petal lobe pattern known to those of skill in the art. However, sectors are vastly different from one another. For example, one sector in a rural community may have very little object interference (e.g., buildings) while another sector in a downtown, metropolitan area may have significantly more object interference, higher traffic, etc. Furthermore, sectors have various shapes when they are divided up such that even if the demographic information or geographic information, etc., is similar, the shape of the sector may itself vary from one sector to another. Customizing a pattern to the cell needs optimizes coverage for a sector. Such customized patterns may differ from the standard petal lobe pattern and may be any shape. The emphasis is not on achieving maximum gain in a main lobe but, rather, on achieving a coverage objective for the sector. Thus, the customized pattern may be anything (e.g., any shape) based on sector needs.

The present invention provides antennas that may produce a plurality of patterns customized to a sector. The plurality of patterns possible for an antenna may be identified as an upper bound calculated as follows:

$$n^2 - 1$$

where n is the number of ports/arrays of an antenna. Thus, a typical 4-port antenna, utilizing the present invention, may produce an upper bound of 15 different patterns ($4^2-1=15$) while an 8-port antenna may produce an upper bound of 63 patterns ($8^2-1=63$). In an embodiment of the present invention, a lower bound of arrays is 1.

While several patterns are possible, the present invention is aimed at identifying a customized pattern with which to associate with the cell tower as a static pattern. Thus, different from beam forming where signals are dynamically adjusted in real-time for short periods of time depending on factors that quickly change, the present invention seeks to provide preconfigured, static customized signal patterns that remain for an extended period of time. The extended period of time may be identified by an administrator of the system. In an embodiment, an extended period of time is at least six months.

The static signals in the present invention refer to those that are preconfigured for a cell tower rather than a beam formed pattern that is subsequently adjusted. In other words, in beam forming, the preconfigured standard pattern of an antenna is subsequently adjusted to beam form a signal to a particular location and is then subsequently returned to the preconfigured standard pattern.

Customization to a sector (or coverage area) may depend on various factors or one or more characteristics of the sector. The one or more characteristics of the sector include, but are not limited to, object interference, population information, demographic information, geographic information, morphology, and the like. Object interference, as used herein, refers generally to one or more objects that weaken (or interfere) with signal strength. Exemplary objects include buildings, houses, landmarks, or any other physical structure. Geographical information may include geographical marks that may interfere with signal strength such as a mountain or tree. Morphology, as used herein, refers generally to a shape of a sector.

Customization may be achieved utilizing the present invention by implementing a system, for example, the system 200 of FIG. 2, including a plurality of power amplifiers associated with each port. Each port may emit a signal at a different power such that a custom signal pattern is emitted by the antenna. The sector needs may determine how to configure the pattern. For instance, the pattern may be "tighter" or "stronger" in some areas than others. An increased number of arrays increases the strength in the pattern. The number of arrays also affects the width of a lobe in the pattern. Furthermore, while the pattern may be altered in existing systems by adjusting the width of signals, the present invention seeks to use phase shifting rather than narrowing beams.

Figure 3:
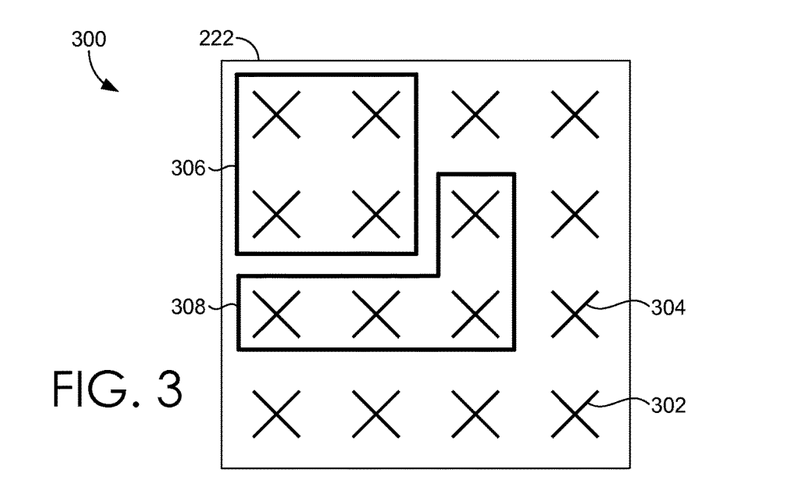
FIG. 3 depicts an exemplary element including a plurality of arrays, according to an embodiment of the present invention.

As illustrated in FIG. 3, the antenna 222 may include several elements, including a plurality of power amplifiers, each power amplifier being indicated by an 'X' in FIG. 3. Each power amplifier is capable of being adjusted to a different power for each pattern. The power amplifiers may also be adjusted to powers different from one another. In an embodiment, the power amplifiers are configured at a power less than a predetermined threshold in order to compensate for the plurality of power amplifiers. Various elements within the power amplifier element 230 may be associated with one another in specific groupings to create arrays for a specific pattern or shape for a sector. For instance, FIG. 3 illustrates a first group 306 and a second group 308 to be utilized to emit a customized signal pattern while PA 302 and PA 304 are not associated with the first group 306 or the second group 308. Such groupings contribute to the specific pattern emitted from the antenna 222. Power amplifiers that are not needed in a custom pattern may be turned off.

Figure 4:
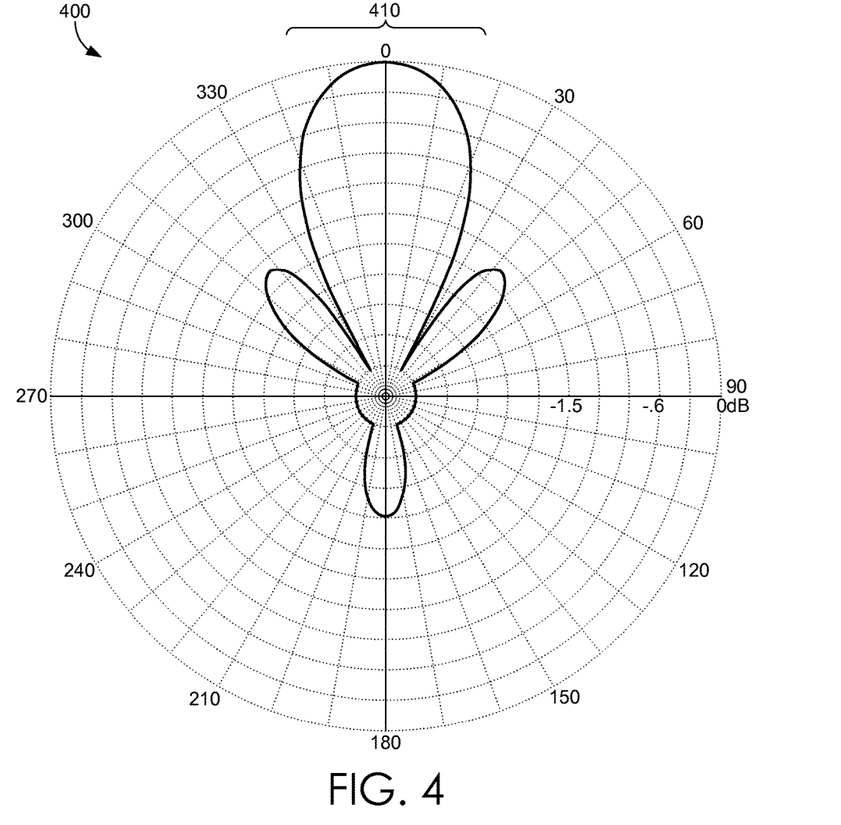
FIG. 4 depicts an exemplary signal pattern, according to an embodiment of the present invention.
Figure 5:
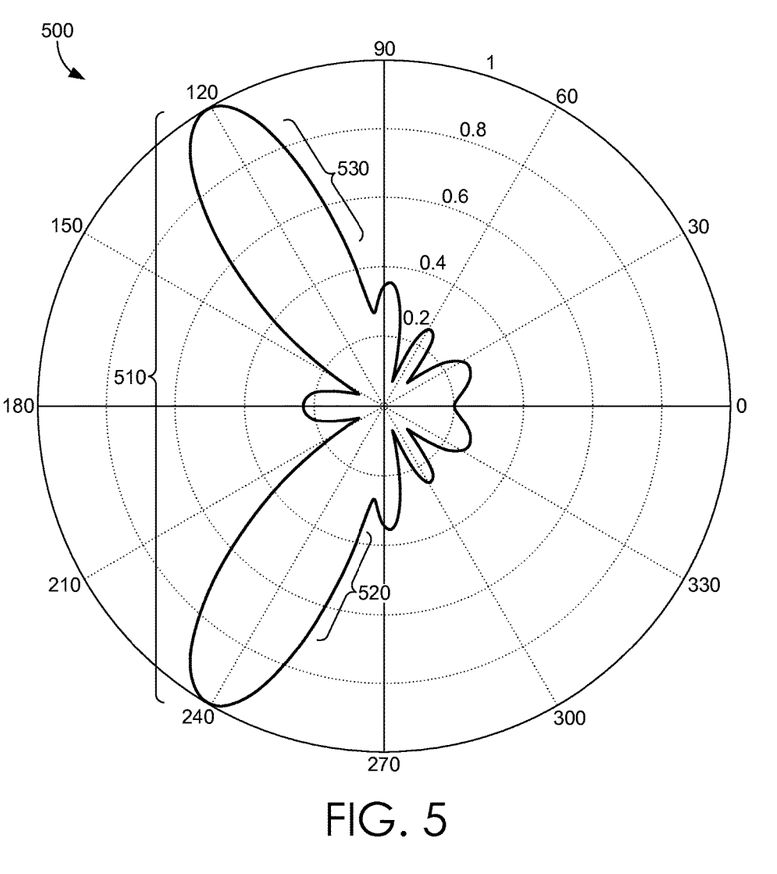
FIG. 5 depicts an exemplary signal pattern, according to an embodiment of the present invention.

FIGS. 4 and 5 illustrate exemplary signal patterns for the present invention. As is apparent from FIGS. 4 and 5, the patterns emitted in the present invention can vary greatly from one another depending on the particular needs of a sector. FIG. 4, for example, illustrates a signal pattern 410 for a first sector while FIG. 5 illustrates a signal pattern 510 for a second sector. Signal pattern 510 includes lobes 520 and 530 that are different powers and shapes from those emitted in FIG. 4 but could be emitted from the same antenna. Additionally, FIGS. 4 and 5 illustrate that the present invention includes adjusting phase angles of arrays as necessary to create the customized static signal pattern to accommodate the sector.

Once the one or more characteristics of a coverage area are identified, a predetermined signal pattern may be identified for the coverage area. The predetermined signal may be identified based on (1) the sector needs and (2) the available signal patterns of the antenna. As previously mentioned, antennas may emit ($n^2-1$) number of patterns so an identified pattern will be included in the ($n^2-1$) number of possible patterns.

Once a pattern is identified from the plurality of possible patterns, the customized signal may be created based on criteria associated with the identified customized signal. For instance, the identified customized signal will indicate which arrays are to be at what power and what phase angle, any groupings of power amplifiers or unnecessary power amplifiers are indicated, and the like. The customized signal may then be created and emitted by the radio tower 211 for a predetermined period of time. As previously explained, the predetermined period of time is likely an extended period of time since the pattern customized is to be emitted as a static pattern rather than an on-the-fly targeted pattern as in beam forming (BF). Once created, an instruction may be communicated to the antenna to emit the customized signal pattern. Alternatively, the antenna may be configured to automatically begin emitting the customized signal pattern upon completion of the creation of the customized signal pattern.

The sectors and/or radio towers may be monitored continuously or upon expiration of a predetermined period of time. The predetermined period of time may be any period of time set by an administrator or someone having rights to determine such time periods with respect to a sector. In the present invention, the predetermined period of time may be an extended period of time such that the customized pattern is emitted as a static pattern. Upon expiration of the predetermined period of time, a status of the sector may be identified. A status may include any changes in the one or more characteristics associated with the sector. For instance, prior to the expiration of the predetermined period of time but subsequent to the initial configuration of the customized signal pattern, the sector may have undergone major construction such that many new buildings were added to what was once vacant area. Another example may include a demolition such that previously existing buildings are no longer present.

Alternatively, the network may be monitored continuously to identify changes in sector needs. However, the customized signal may not be altered in real-time to satisfy the change in sector needs. The changed characteristic may be updated for review at the expiration of the predetermined period of time such that the customized signal pattern may be further customized to meet needs of a changing sector. For example, assume a new subdivision goes up in a sector. This change in landscape may be noted such that when the radio tower is reconfigured at the expiration of the predetermined time period an updated signal pattern may be created.

Figure 6:
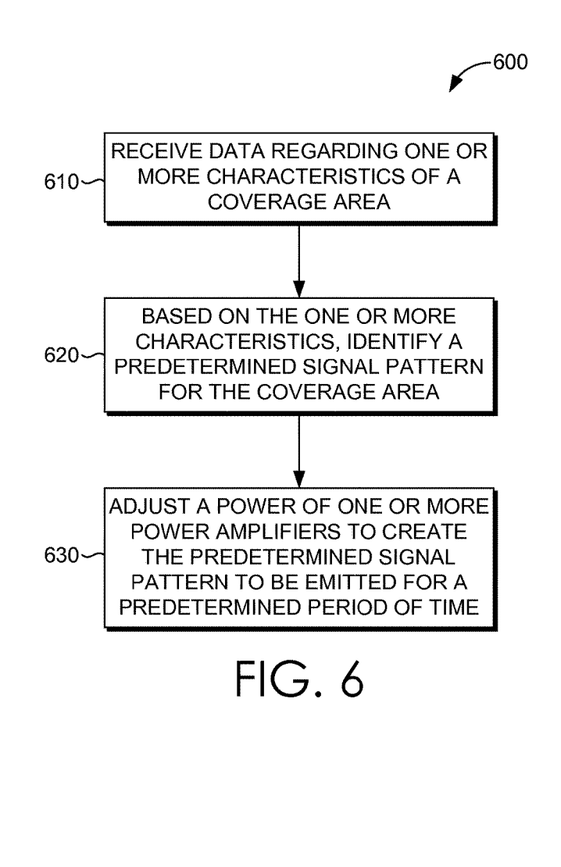
FIGS. 6-8 depict exemplary flow diagrams of exemplary methods of optimizing coverage, according to embodiments of the present invention.

Turning now to FIG. 6, a flow diagram is shown illustrating an exemplary method 600 for optimizing coverage, in accordance with an embodiment of the present invention. At block 610, data regarding one or more characteristics of a coverage area is received. The one or more characteristics may include object interference data, population information, demographic information, geographic information, morphology information, and the like. At block 620, a predetermined signal pattern is identified for the coverage area. The predetermined signal pattern, while being one of a plurality of available signal patterns, is selected based on the one or more characteristics of the coverage area and is, thus, customized to the coverage area to optimize experience. At block 630, a power of one or more power amplifiers is adjusted in order to create the predetermined signal pattern that is to be emitted for a predetermined period of time.

Figure 7:
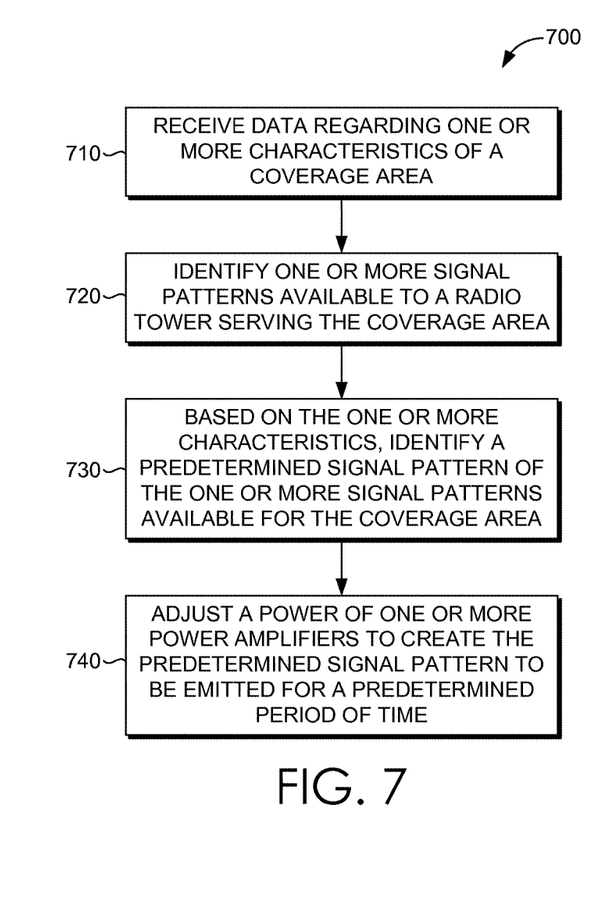

Turning now to FIG. 7, a flow diagram is shown illustrating an exemplary method 700 for optimizing coverage, in accordance with an embodiment of the present invention. At block 710, data regarding one or more characteristics of a coverage area is received. The one or more characteristics may include object interference data, population information, demographic information, geographic information, morphology information, and the like. At block 720, one or more signal patterns available to a radio tower serving the coverage area are identified. A number of available signal patterns may be identified using the $n^2-1$ formula, where n is the number of ports/arrays of an antenna. At block 730, a predetermined signal pattern of the one or more signal patterns available for the coverage area is identified. At block 740, a power of one or more power amplifiers is adjusted to create the predetermined signal pattern to be emitted for a predetermined period of time.

Figure 8:
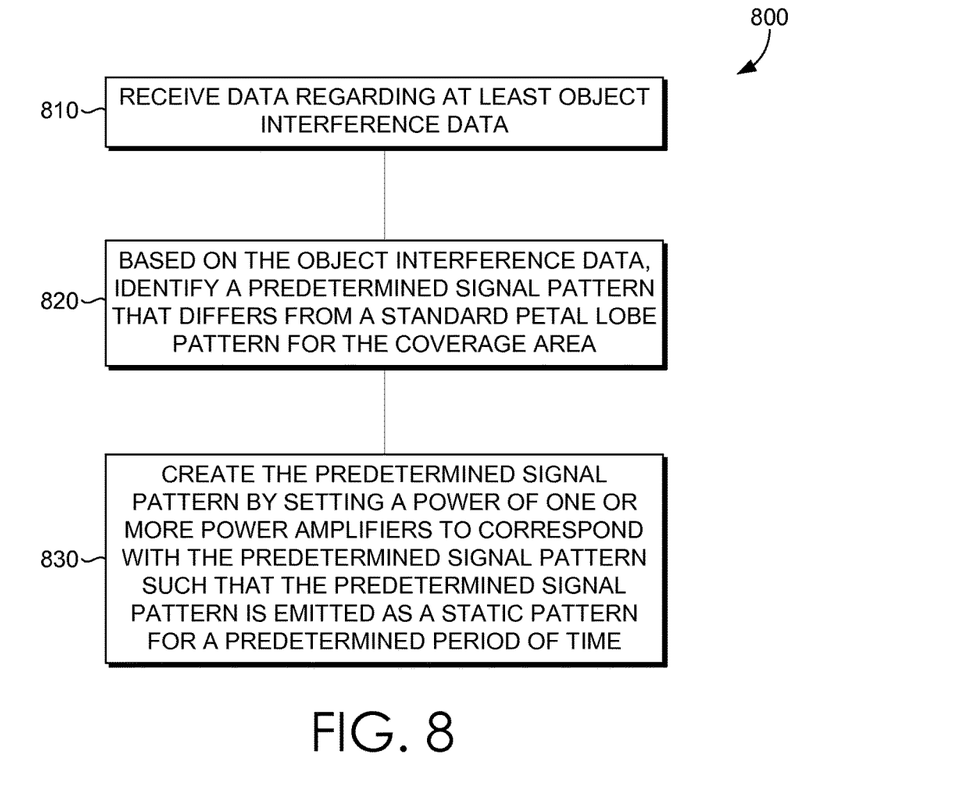

Turning now to FIG. 8, a flow diagram is shown illustrating an exemplary method 800 for optimizing coverage, in accordance with an embodiment of the present invention. At block 810, data regarding at least object interference data is received. Object interference data, as explained above, refers generally to one or more objects that weaken (or interfere) with signal strength. Exemplary objects include buildings, houses, landmarks, or any other physical structure. At block 820, a predetermined signal pattern is identified based on the object interference data. For instance, a signal pattern that accommodates a building structure may be identified rather a signal pattern that does not take the building structure into account. The predetermined signal pattern may differ from the standard petal lobe pattern. For instance, if the building structure is located at a peak location in the standard petal lobe pattern, it would not be optimal to use the standard petal lobe pattern. Rather, it would be more effective to customize a pattern that accounts for the location of the building and focuses signal strength in other areas. At block 830, the predetermined signal pattern is created by setting a power of one or more power amplifiers to correspond with the predetermined signal pattern such that the predetermined signal pattern is emitted as a static pattern for a predetermined period of time.

It will be understood by those of ordinary skill in the art that the order of steps shown in the methods 600 of FIG. 6, 700 of FIG. 7, and 800 of FIG. 8 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations of utility and may be employed without reference to other features and subcombinations and are contemplated within the scope of the claims.

What is claimed is:

1. One or more non-transitory computer-readable storage media having computer-executable instructions embodied thereon that, when executed, perform a method, the method comprising:
   receiving data regarding one or more characteristics of a coverage area before emitting a predetermined signal pattern for a predetermined period of time, wherein the one or more characteristics includes object interference;
   based on the one or more characteristics, identifying the predetermined signal pattern for the coverage area;
   adjusting a power of one or more power amplifiers to create the predetermined signal pattern to be emitted for the first predetermined period of time;
   statically emitting the predetermined signal pattern until an expiration of the first predetermined period of time; and
   monitoring a telecommunications cell site at the expiration of the first predetermined period of time to obtain updated data for use in a second predetermined period of time.

2. The media of claim 1, wherein the predetermined signal pattern differs from a standard petal lobe pattern.

3. The media of claim 1, wherein object interference indicates one or more objects that weaken a signal strength including a building, a landmark, or any physical structure.

4. The media of claim 1, further comprising communicating an instruction to an antenna to emit the predetermined signal pattern.

5. The media of claim 1, further comprising updating the one or more characteristics for the second predetermined period of time.

6. The media of claim 1, wherein the predetermined signal pattern to be emitted for a predetermined period of time is emitted as a static signal pattern for the predetermined period of time.

7. The media of claim 1, wherein the one or more characteristics further comprises population information, demographic information, and geographic information.

8. A method for optimizing coverage by adjusting signal patterns in a wireless communications network, the method comprising:
   receiving data regarding one or more characteristics of a coverage area before emitting a predetermined signal pattern for a predetermined period of time, wherein the one or more characteristics includes object interference;
   identifying one or more signal patterns available to a radio tower serving the coverage area;
   based on the one or more characteristics, identifying the predetermined signal pattern of the one or more signal patterns available for the coverage area;
   adjusting a power of one or more power amplifiers to create the predetermined signal pattern to be emitted for a first predetermined period of time; and
   monitoring a telecommunications cell site at an expiration of the first predetermined period of time to obtain updated data for use in a second predetermined period of time.

9. The method of claim 8, wherein the predetermined signal pattern differs from a standard petal lobe pattern.

10. The method of claim 8, wherein object interference indicates one or more objects that weaken a signal strength including a building, a landmark, or any physical structure.

11. The method of claim 8, further comprising communicating an instruction to an antenna to emit the predetermined signal pattern.

12. The method of claim 8, further comprising updating the one or more characteristics for the second predetermined period of time.

13. The method of claim 8, wherein the predetermined signal pattern to be emitted for a predetermined period of time is emitted as a static signal pattern for the predetermined period of time.

14. The method of claim 8, wherein the one or more characteristics further comprises population information, demographic information, and geographic information.

15. One or more non-transitory computer-readable storage media having computer-executable instructions embodied thereon that, when executed, perform a method, the method comprising:
   receiving data regarding at least object interference data before emitting a predetermined signal pattern for a predetermined period of time, wherein object interference data indicates one or more objects that interfere with a signal strength;
   based on the object interference data, identifying a predetermined signal pattern that differs from a standard petal lobe pattern for the coverage area;
   creating the predetermined signal pattern by setting a power of one or more power amplifiers to correspond with the predetermined signal pattern such that the predetermined signal pattern is emitted as a static pattern for a predetermined period of time; and
   monitoring a telecommunications cell site at an expiration of the predetermined period of time to obtain updated data for use in a second predetermined period of time.

16. The media of claim 15, wherein the one or more objects includes a building, a landmark, or any physical structure.

17. The media of claim 15, wherein the data further comprises population information, demographic information, and geographic information.

18. The media of claim 15, further comprising communicating an instruction to an antenna to emit the predetermined signal pattern, wherein the antenna is configured to emit a plurality of patterns based on the data received.

* * * * *